United States Patent [19]

Puccinelli et al.

[11] 4,445,307

[45] May 1, 1984

[54] SCAFFOLD JOINT FOR A SCAFFOLD STRUCTURE

[75] Inventors: Joseph S. Puccinelli; Paul J. Lukezich, both of Milwaukee, Wis.

[73] Assignee: Figgie International Inc., Richmond, Va.

[21] Appl. No.: 439,824

[22] Filed: Nov. 8, 1982

[51] Int. Cl.³ .......................................... E04G 7/00
[52] U.S. Cl. .................................. 52/638; 182/178; 403/49; 403/246
[58] Field of Search ................. 52/638, 637, 648, 654, 52/655, 694, 36; 403/49, 246, 171, 175, 350, 374, 377; 182/178, 179

[56] References Cited

U.S. PATENT DOCUMENTS

| | | | |
|---|---|---|---|
| 835,280 | 11/1906 | Haskell | 52/648 |
| 3,195,735 | 7/1965 | Jay | 403/49 |
| 3,268,252 | 8/1966 | Rolland | 287/50 |
| 3,440,189 | 1/1970 | Gostling | 52/648 |
| 3,482,873 | 12/1969 | Pivacek | 403/49 |
| 3,992,118 | 11/1976 | Siegers | 403/171 |
| 4,090,798 | 5/1978 | Barton | 182/178 |
| 4,180,342 | 12/1979 | Layher | 182/179 |
| 4,273,463 | 6/1981 | Dobersch | 403/246 |
| 4,369,859 | 1/1983 | Smits | 403/49 |

OTHER PUBLICATIONS

Ringlok Scaffolding System; Coffral S.A. International, Eppegemsesteenweg 29, 1850 Grimbergen, Belgium Europe.

Primary Examiner—J. Karl Bell
Attorney, Agent, or Firm—Michael, Best & Friedrich

[57] ABSTRACT

A scaffold joint for connectng the ends of horizontal scaffold members to vertical scaffold members. Spaced pairs of ring support members are fastened to the vertical scaffold members by welding or other suitable means. End connector assemblies are fastened to the ends of the horizontal scaffold members. Each of said end connector assemblies includes an end connector member and a locking member slidably mounted thereon. Each end connector member has a pair of ring engaging portions adapted for engagement with the spaced ring support members on said vertical scaffold members. The locking members are adapted when moved to their locked position to make tight wedging contact with a ring support member, thereby causing the ring engagement portions on the end connector members to be forced into tight engagement with the ring support members to thereby lock the horizontal scaffold members to the vertical scaffold members.

18 Claims, 11 Drawing Figures

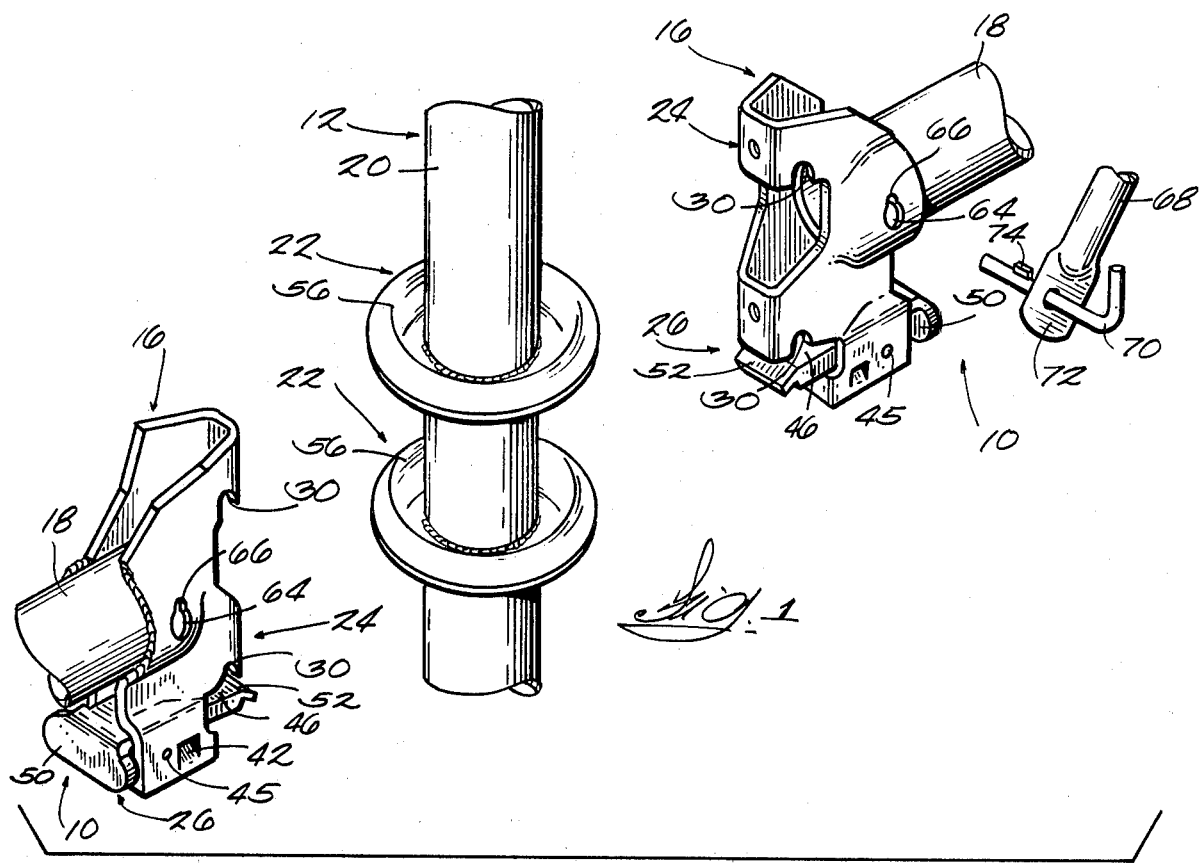

SCAFFOLD JOINT FOR A SCAFFOLD STRUCTURE

BACKGROUND OF THE INVENTION

1. Field of the Invention

This invention relates to scaffolding and more particularly to a scaffold joint for connecting the ends of horizontal scaffold members to vertical scaffold members.

2. Description of the Prior Art

A prior scaffold joint known to applicant is shown in U.S. Pat. No. 3,992,118. Another prior art scaffold joint known to applicant is available commercially under the trademark "RING LOC". In such prior art scaffold joint constructions, if it is desired to install or remove a single horizontal scaffold member from a vertical scaffold member, all the remaining horizontal scaffold members connected at the connection point must be unlocked. One of the principal advantages of the present scaffold joint construction is that the horizontal scaffold members can be independently locked and unlocked without disturbing the other horizontal scaffold members connected to the vertical scaffold member at the same point. Other advantages of the scaffold joint of the present invention will become apparent from the description which follows.

SUMMARY OF THE INVENTION

A scaffold joint for connecting the ends of a horizontal scaffold member to a vertical scaffold member including a pair of ring support members fastened to the vertical support member in a vertically spaced relationship. The horizontal scaffold members have end connector assemblies fastened to the ends thereof. The end connector assemblies are comprised of an end connector member and a locking member slidably mounted thereon. Each of the end connector members has a pair of ring engagement portions adapted for engagement with the spaced ring support members on the horizontal scaffold member. The locking members are adapted when moved to their locked position to make tight wedging contact with a ring support member and thereby cause the ring engagement portions of said end connector members to be forced into tight engagement with the ring support members.

DESCRIPTION OF THE DRAWINGS

FIG. 1 is a perspective view of a scaffold joint made in accordance with the present invention;

FIG. 2 is a side elevation view of a horizontal runner assembly connected to a vertical support member;

FIG. 9 is plan view of a ring member;

FIG. 10 is a sectional view taken along line 10—10 of FIG. 9;

DESCRIPTION OF THE PREFERRED EMBODIMENT

Figure 3:
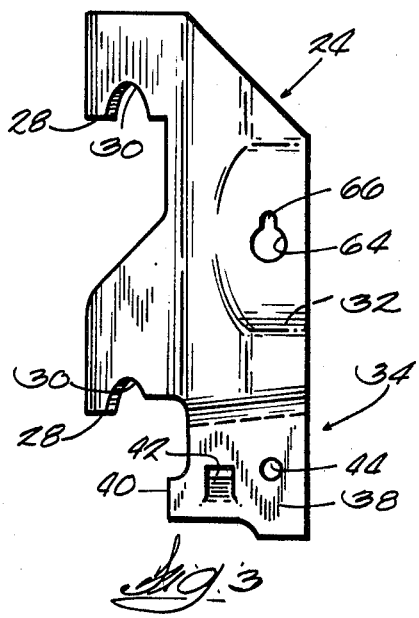
FIG. 3 is a side elevation view of an end connector member.
Figure 4:
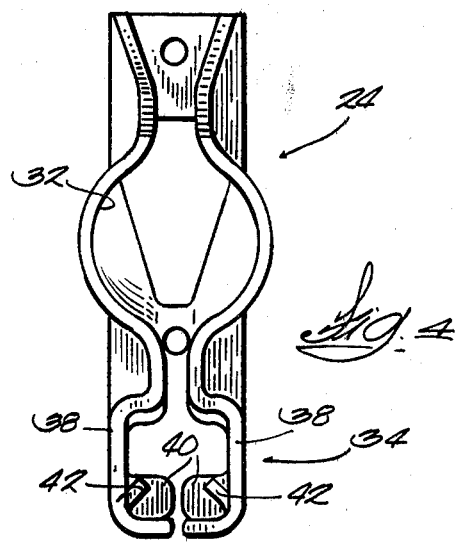
FIG. 4 is an end view of the end connector member shown in FIG. 3.
Figure 5:
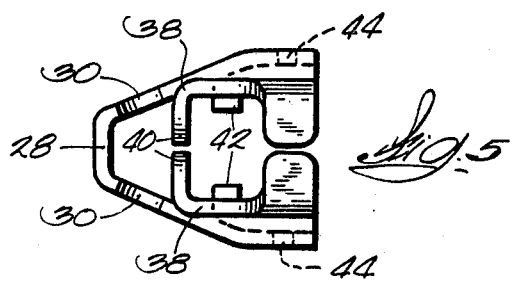
FIG. 5 is a bottom view of the end connector shown in FIG. 3.

As best shown in FIG. 1, the scaffold joint of the present invention in its simplest embodiment is comprised of horizontal assemblies 10 and a vertical support assembly 12. Each horizontal assembly 10 is comprised of two basic parts, namely, a horizontal support member 18 and a pair of end connector assemblies 16 mounted on opposite ends thereof. Each vertical support assembly 12 is comprised of a vertical support member 20 and a plurality of spaced ring support members 22, 22 mounted thereon. Each end connector assembly 16 is comprised of an end connector member 24 and a locking wedge member 26. As will be explained hereinafter, a typical scaffold structure would employ a plurality (up to 8) horizontal assemblies 10 attached to each pair of ring support member 22, 22 of a vertical support assembly 12. As best shown in FIGS. 3, 4 and 5, each end connector member 24 has a pair of downwardly extending tongue portions 28, 28 and a pair of downwardly opening grooves 30, 30 adjacent tongues 28, 28. Member 24 is also provided with a socket 32 formed in one end thereof to receive the end of a horizontal support member 18. In the preferred embodiment, support members 18 are secured by welding.

The lower portion 34 of each end connector member 24 is formed to accommodate a locking wedge member 26 (see FIGS. 2, 6, 7 and 8). More specifically, portion 34 is comprised of side walls 38, 38 and a pair of horizontal support tabs 40, 40. Ears 42, 42 are bent inwardly from walls 38, 38 and aligned openings 44, 44 are also provided in walls 38, 38. Wedge members 26 are assembled on end connector members 24 by inserting members 26 through lower portions 34 between side walls 38, 38. A pin 45 is then installed in openings 44, 44 to retain wedge member in assembled position. Pin 45 is securely held in openings 44, 44 by a press fit. The function of these parts will be explained in detail hereinafter.

Figure 6:
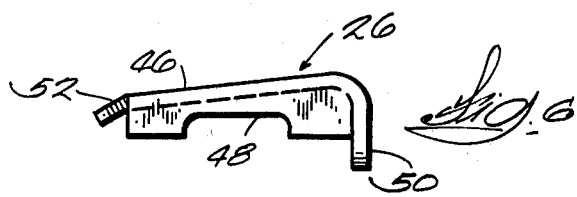
FIG. 6 is a side elevation view of a locking wedge member.
Figure 8:
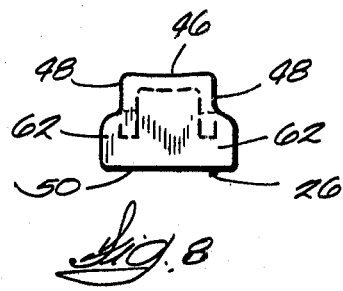
FIG. 8 is an end view of the wedge member shown in FIG. 6.
Figure 7:
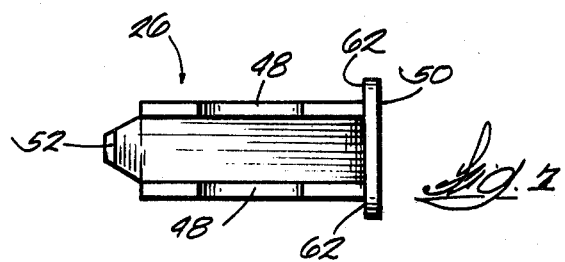
FIG. 7 is a bottom view of the wedge member shown in FIG. 6.

Referring now to FIGS. 6, 7 and 8, locking wedge member 26 is comprised of a sloping top portion 46, side walls 48, 48, a depending end wall 50 and an angled nose portion 52.

Referring to FIGS. 9 and 10, ring support members 22 are of a circular configuration and have a circular opening 54 in the center thereof. As shown in FIG. 10, each ring 22 is provided with an upstanding nose portion 56 extending around the periphery thereof. Rings 22 are also provided with a plurality of drain openings 58. The underside of rings 22 are curved as at 60 adjacent nose portion 56. Rings 22 are assembled on a vertical support member 20 in spaced relationship as shown in FIG. 1 and then permanently fastened thereon by welding.

In use, horizontal assemblies 10 are connected to vertical support assemblies 12 by first positioning an end connector assembly 16 on a pair of spaced support rings 22 as shown in FIG. 2, i.e., with the nose portion 56 on each ring 22 seated in grooves 30 in the connector member 24. When so positioned, tongues 28, 28 on the connector member 24 fit snugly around the inside of nose portions 56.

The next step is to lock the horizontal runner 10 to the vertical support 12. This is accomplished by forcing lock wedge 26 inwardly toward the vertical support assembly 12. This is done by striking wedge end wall 50 with any suitable tool such as a hammer. As wedge 26 is forced into locking position, it will be supported on horizontal tabs 40, 40. Ears 42, 42 serve to guide the movement of wedge 26. As the wedge is forced into locking position, sloping top portion 46 thereof will slide into contact with surface 60 on the underside of the lower support ring 22 to thereby exert a downward force on the connector member 24. Such downward force will force nose portions 56 on rings 22 into tight engagement in grooves 30 in the end connector member to thereby securely lock the horizontal assembly 10 onto the vertical support assembly 12.

When it is desired to disconnect the runner 10 from the vertical support 12, wedge 26 is forced back out of its locked position. As shown in FIGS. 7 and 8, end wall 50 of wedge 26 extends outwardly beyond side walls 48, 48 as indicated by reference numeral 62. Thus, when it is desired to slide wedge back to its unlocked position, this can be readily accomplished by tapping on portions 62 of the wedge with a hammer or similar tool.

As indicated previously, wedge 26 is prevented from sliding completely out of end connector 24 by pin 45. If for any reason it becomes necessary to replace wedge 26, pin 45 is removed, a new wedge is installed, and pin 45 is replaced.

Referring to FIG. 1, end connector members 26 are provided with openings 64 in the sides thereof. Openings 64 are provided with a key-way 66. Such openings 64 serve to facilitate connection of diagonal braces 68 to the horizontal runner assemblies 10. Diagonal braces 68 are provided with connector pins 70 which are rotatably mounted in the flat end portion 72 of braces 68. The connector pins 70 are provided with a lug 74 in the end portion thereof. To connect a brace 68 to a connector member 26, the end of pin 70 is inserted into aligned openings 64 with lug 74 aligned with key-ways 66. The pin is then rotated to securely connect the parts to each other.

Figure 11:
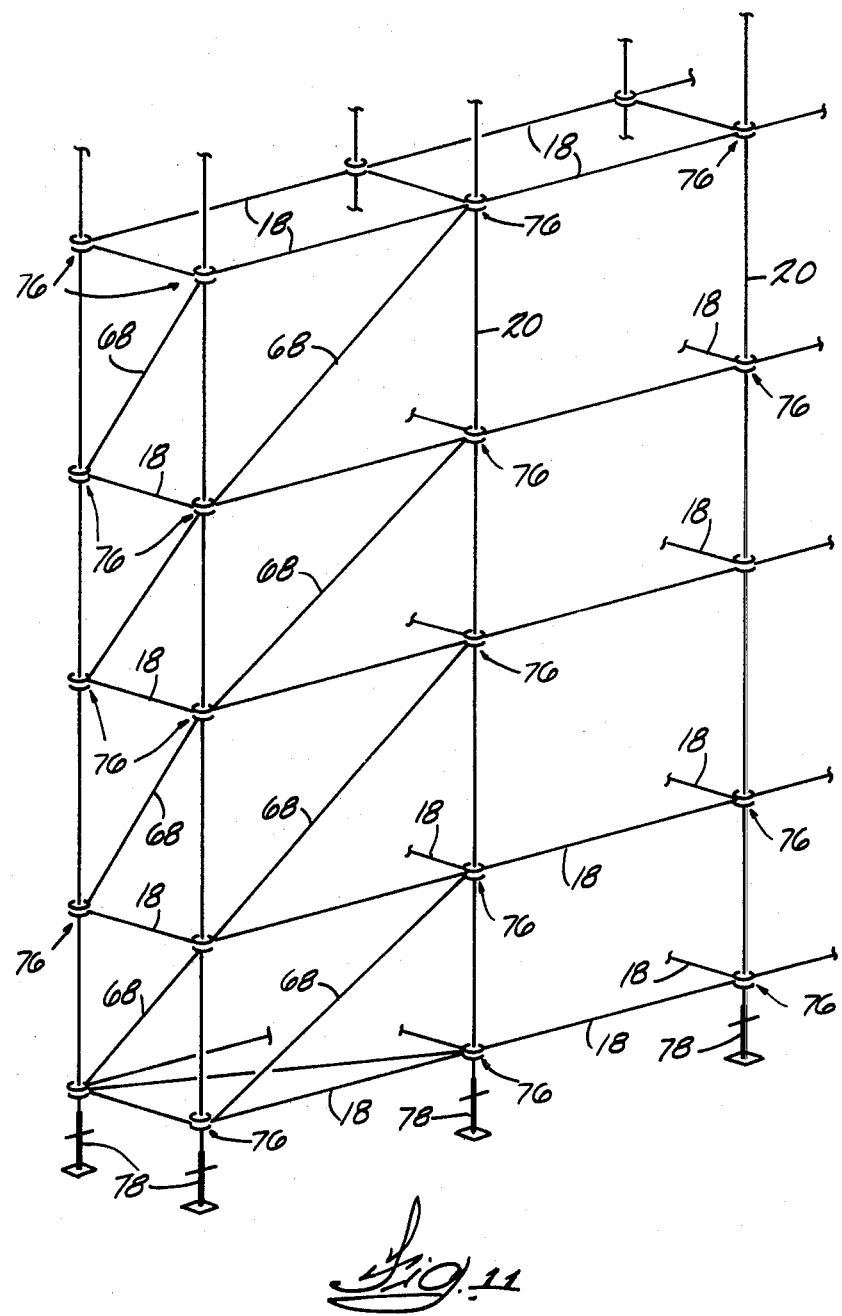
FIG. 11 is a partially schematic perspective view of a scaffold structure of the type which can be erected, using scaffold joints made in accordance with the present invention.

As indicated previously, each pair of support rings 12 can accommodate a plurality of horizontal runners 10. FIG. 11 shows a partially schematic view of a scaffold structure of the type wich can be erected using scaffold joints made in accordance with the present invention. Such scaffold structure is made up of a plurality of horizontal members 18 connected to a plurality of vertical members 20 by means of scaffold joints referred to as an assembled unit by reference numeral 76. Scaffold joints 76 would, of course, be constructed as described previously herein with reference to FIGS. 1-10. The scaffold structure shown in FIG. 11 also includes diagonal braces 68 and screw jack supports 78.

It will be appreciated from the foregoing description that the scaffold joint of the present invention provides an exceptionally rigid moment connection wherein the horizontal runners can be easily placed at any angle around the support rings on the vertical support member. The end connector members 24 are designed so that the horizontal runners can be individually placed, locked and removed without disturbing the attachment of other horizontal runners. Furthermore, the horizontal runners can be assembled on the support rings and will remain there in a reasonably secure position before the locking wedge is forced into its locked position to thereby facilitate erection and dismantling of the scaffold. The wedge lock is located below the horizontal runner making it easy to engage and disengage from below. The wedge lock member can be visually checked to see that it is properly engaged and the wedge can be easily removed and replaced if it becomes damaged or worn. The diagonal brace connection openings 64 in the sides of end connector members 24 faciliatate ready connection of diagonal braces 68 to the scaffold structure. Also, since the connection of a diagonal brace is made directly to an end connector member, a horizontal scaffold member must be erected before a diagonal brace can be erected, thus preventing inadvertent erection of a diagonal brace without first erecting a horizontal member.

We claim:

1. A scaffold joint for connecting the ends of a horizontal scaffold member to a vertical scaffold member comprising:

a pair of ring support members fastened to the vertical scaffold member in a vertically spaced relationship;

an end connector assembly fastened to the end of a horizontal scaffold member, said end connector assembly comprised of an end connector member and a locking member slidably mounted thereon, said end connector member having a pair of ring engagement portions adapted for removable engagement with said spaced ring support members, said locking member adapted when moved to its locked position to make tight contact with one of said ring support members to thereby cause said ring engagement portions to be forced into tight contact with said ring support members.

2. A scaffold joint according to claim 1 in which said ring engagement portions on said end connector member are in the form of a pair of upwardly extending vertically spaced grooves.

3. A scaffold joint according to claim 2 in which said ring support members are each provided with an upstanding circular nose portion adapted to engage with said spaced grooves in said end connector member.

4. A scaffold joint according to claim 1 in which said locking member has a sloping surface thereon adapted for engagement with the underside of one of said ring support members.

5. A scaffold joint according to claim 4 in which said locking member engages the lower ring support member.

6. A scaffold joint according to claim 4 in which said end connector assembly includes a retaining pin removably mounted therein, said pin positioned adjacent said locking member to prevent said locking member from becoming displaced from said end connector member.

7. A scaffold joint according to claim 4 in which said locking member has a depending wall portion on one end thereof to facilitate pounding said member into locking position.

8. A scaffold joint according to claim 7 in which said depending wall portion extends beyond the edges of the body of said locking member to provide ear portions to facilitate pounding said member into its unlocked position.

9. A scaffold joint according to claim 1 in which said end connector member has a pair of aligned diagonal brace connection openings in the sides thereof adapted to provide for a removable connection between a diagonal brace and said end connector member.

10. A scaffold joint according to claim 9 in which said diagonal brace connection openings have a keyway formed therein.

11. A scaffold joint for connecting the ends of a plurality of horizontal scaffold members to a vertical scaffold member comprising:

a pair of ring support members fastened to the vertical support member in a vertically spaced relationship, said ring support members having an upstanding circular nose portion extending around the periphery thereof;

an end connector assembly fastened to the end of each of said plurality of horizontal scaffold members, each of said end connector assemblies comprised of an end connector member and a locking member slidably mounted thereon, each of said end connector members having a pair of ring engagement portions adapted for engagement with said upstanding circular nose portions on said spaced ring support members, said locking member of each end connector assembly adapted when moved to its locked position to make tight contact with one of said ring support members to thereby cause said ring engagement portions of each of said end connector members to be forced into tight engagement with said upstanding circular nose portions on said ring support members, said spaced ring support members adapted to accommodate a plurality of end connector assemblies thereon, each of said end connector assemblies capable of being independently locked and unlocked from said ring support members.

12. A scaffold joint according to claim 11 in which said ring engagement portions on said end connector members are in the form of a pair of upwardly extending vertically spaced grooves adapted for engagement with said upstanding circular nose portions on said ring support members.

13. A scaffold structure comprising:
a plurality of vertical scaffold members;
said vertical scaffold members having pairs of ring support members fastened thereto in a vertically spaced relationship;
a plurality of horizontal scaffold members;
a pair of end connector assemblies fastened to the ends of said plurality of horizontal scaffold members, each of said end connector assemblies comprised of an end connector member and a locking member slidably mounted thereon, each of said end connector members having a pair of ring engagement portions adapted for removable engagement with said spaced ring support members on said vertical scaffold members, said locking member of each end connector assembly adapted when moved to its locked position to make tight contact with a ring support member to thereby cause said ring engagement portions to be forced into tight contact engagement with said ring support members.

14. A scaffold structure according to claim 11 in which said ring engagement portions on said connector members are in the form of a pair of upwardly extending vertically spaced grooves.

15. A scaffold structure according to claim 12 in which said spaced pairs of ring support members are each provided with an upstanding circular nose portion adapted to engage with said spaced grooves in said end connector members.

16. A scaffold structure according to claim 13 in which there are a plurality of diagonal braces connected between pairs of horizontal scaffold members, said diagonal braces connected to said end connector members of said end connector assemblies by a removable connection means.

17. A scaffold structure according to claim 16 in which said removable connection means includes a pair of aligned openings in the sides of said end connector members and a connector pin rotatably mounted in the ends of said diagonal braces.

18. A scaffold structure according to claim 16 in which said aligned openings have a keyway formed therein and said connector pins have a lug thereon for cooperation with said keywas.

* * * * *

UNITED STATES PATENT AND TRADEMARK OFFICE
CERTIFICATE OF CORRECTION

PATENT NO. : 4,445,307
DATED : May 1, 1984
INVENTOR(S) : Joseph S. Puccinelli, Paul J. Lukezich It is certified that error appears in the above—identified patent and that said Letters Patent is hereby corrected as shown below:

Column 4, Line 7, After "members 24" delete "facilia-"

and substitute therefor ---facili---

Column 6, Line 18, Claim 13, Before "with" delete

---engagement---

Column 6, Line 42, Claim 18, After "said" delete "keywas"

and substitute therefor ---keyway---

Signed and Sealed this

Sixteenth Day of October 1984

[SEAL]

Attest:

GERALD J. MOSSINGHOFF

Attesting Officer      Commissioner of Patents and Trademarks